July 23, 1968  J. M. TISO  3,393,554

VIBRATION TABLE WITH SELF-ADJUSTING GAS BEARING

Filed Nov. 9, 1964

JOHN M. TISO
INVENTOR.

BY *[signature]*

ATTORNEY

United States Patent Office 3,393,554
Patented July 23, 1968

3,393,554
VIBRATION TABLE WITH SELF-ADJUSTING
GAS BEARING
John M. Tiso, Northridge, Calif., assignor to International
Telephone and Telegraph Corporation, New York,
N.Y., a corporation of Maryland
Filed Nov. 9, 1964, Ser. No. 409,792
7 Claims. (Cl. 73—71.6)

ABSTRACT OF THE DISCLOSURE

A vibration table for carrying objects to be vibration tested has portions of its lower and side surfaces defining gas bearing elements. A support base includes further gas bearing elements disposed opposite those of the table and for cooperation therewith. Those elements on the base cooperating with the side elements of the table are secured in a spaced manner to the base by resilient members. With no gas in the bearing, the side bearing elements are held in contact with the corresponding elements of the base. Admission of gas between the bearing elements separates the side elements of the table from their counterparts on the base through compression of the resilient members.

Figure 2:
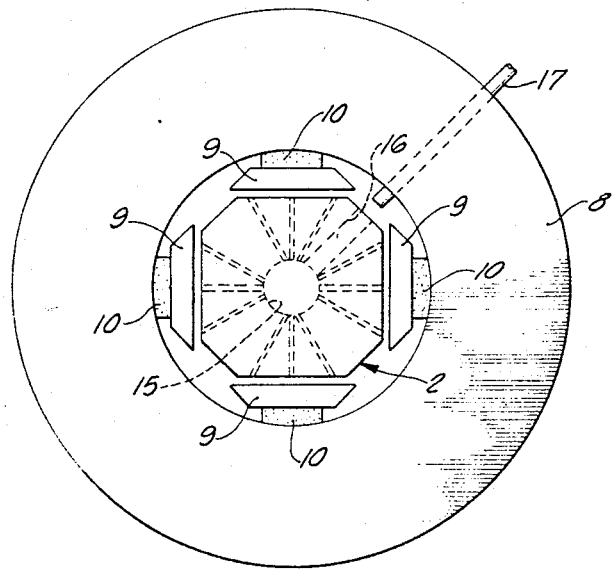

This invention relates in general to vibrating machines and in particular to an elastic support for the vibration table of an electrodynamic type of vibration machine. Its principal object is to provide an improved gas bearing for the vibration table of a machine of the above character which is economical to fabricate and which is self adjusting to automatically compensate for thermal expansion and contraction problems.

There has long been a need for a vibration or shaker machine which, with a minimum of force, generates large movements of a vibration or shaker table in a direction normal to the table surface while the table is constrained against movement, including rotation, in all other directions. As the accuracy requirements assigned a component being tested by the vibrating machine are increased, particularly for calibration work, the desirability for a shaker table operating with a single degree of freedom likewise increases.

Prior-art vibration machines have used various types of suspension arrangements for the vibration table, including leaf-spring suspension, loop-spring suspension, taut-wire suspension, rubber pad suspension and air-bearing suspension. While each of these suspension systems has certain advantages, the gas bearing most closely approaches the ideal performance of a single degree of freedom system. While no other known bearing arrangements can match the high compliance of the gas bearings in the direction of motion and their high stiffness in the directions normal thereto, gas bearing systems have been quite limited in their application to vibration machines.

One of the reasons for the limited application of gas bearings to vibration machines is that the bearing surfaces have been rigidly secured to the housing and must be accurately machined to obtain the desired spacing between the fixed bearing surface and the bearing surface of the moving table.

Another disadvantage of known gas bearing suspension systems is that uneven thermal expansion or contraction between the fixed and moving bearing surfaces often result in freezing the table or exceeding the maximum bearing gap. While this can be somewhat lessened by using similar materials in both bearings or materials with a low coefficient of expansion, a resulting increase in cost is usually involved. Also, when a refrigerated or heated component is to be tested, the thermal problem becomes magnified.

Accordingly, it is an object of this invention to provide a new and improved gas bearing suspension system for a vibration machine which obviates the need for accurately controlled machining and assembly.

Another object is to provide a new and improved gas bearing suspension system for a vibration machine which automatically adjusts itself to assume a proper air gap to compensate for thermal expansion and contraction problems.

In the present invention, the foregoing objects are accomplished by mounting the stationary portions of the gas bearing on heavily damped elastic pads which normally hold the bearing surfaces in abutting relationship but which become compressed when a gas is passed between the cooperating bearing surfaces. The stiffness of the pads determines the air film thickness in the bearing gap or lubricating region and the stiffness of these pads can be made quite high to provide stiff constraint to movement of the movable bearing portion in all directions but the direction of free reciprocating motion of the table.

The inventive arrangement is much more economical than the prior art devices since the requirement for the establishment of the thickness of the air gap by tight machining procedures is eliminated. Also, parallelism of the bearing surfaces is easily accomplished and is largely independent of machining since the bearing surfaces by virtue of the resilient pads, will adjust themselves to provide a gap for the flow of the lubricating air film. The only machining requirement is to obtain good flat surfaces on one face of the bearing, which flatness can be achieved at a moderate cost, for example, by a lapping operation.

The inventive arrangement overcomes the major problem of thermal expansion and contraction encountered in gas bearing suspensions. The bearing gap must necessarily be small, for example, on the order of one-thousandth of an inch, in order to prevent the possibility of lateral vibrations due to the compressibility of gas and other undesirable characteristics. With these close clearances, expansion of the moving bearing, which generally has a greater mass than the fixed bearing, often causes the two bearing sections to tightly contact each other and become frozen in position. The present invention overcomes this problem since the elastic mounting for the fixed bearing automatically adjusts to compensate for dimensional changes in the bearing.

Figure 1:
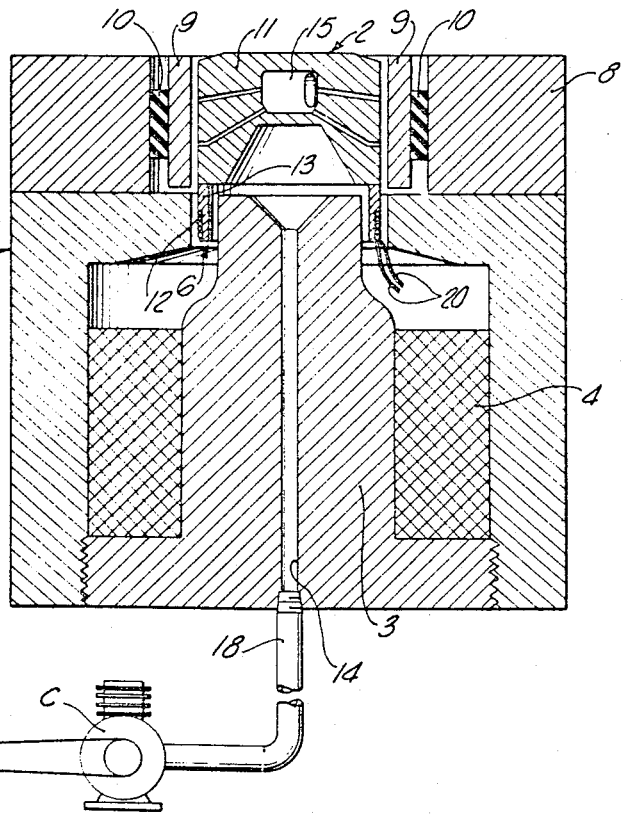

Other objects and features of the invention will become apparent and the invention will be best understood when the specification and claims are read in conjunction with the accompanying drawings comprising FIGS. 1 and 2 in which:

FIG. 1 shows a sectional view of a simplified vibration machine incorporating the inventive gas bearing suspension system; and FIG. 2 shows a top view of the suspension portion of the machine of FIG. 1.

The vibration machine suspension system consists generally of a fixed electromagnetic assembly 1 and a moving table assembly 2 completely suspended in the electromagnetic assembly by gas bearings independently of any mechanical supports. The electromagnetic assembly 1 may be rigidly secured to a machine frame or housing (not shown) or may be portable.

The electromagnetic assembly 1 comprises a magnetic core 3 surrounded by a winding 4, all mounted within a cup-shaped pole piece assembly 5. Assembly 5 includes an aperture at one end for permitting the passage of one end of core 3 therethrough and which, when assembled as shown, defines a magnetic circuit having a fixed air gap 6 extending around the free end of the core 3. A permanent magnet could satisfactorily be used in lieu of the electromagnetic coil and core assembly.

A bearing supporting ring 8 is rigidly secured to the outer surface of the pole 5.

Fixed bearing 9, four of which are shown in the preferred embodiment and preferably made of aluminum, are placed within and evenly spaced about the inner periphery of ring 8 and are separated from the ring 8 by elastic inserts or support pads 10. These pads 10 may comprise closed cellular silicone rubber, for example, and may be individual inserts as shown or a continuous ring. As will be described more fully hereinafter, elastic pads 10 may be secured to the bearings 9 and support 8 by mechanical connectors or by adhesives. In the present embodiment, the bearings 9 are held in abutting relation with the cooperating bearing surface by the pressure exerted by the pads 10 being slightly compressed. The core 3 includes a duct or passage 14 for supplying compressed gas from a supply source to the free end of the core 3. As will be explained hereinafter, the compressed gas provides a support for the table assembly 2 when the vibration machine is operated in a vertical position.

The table assembly 2 comprises a generally octagonal element 11 having a flat bearing surface on the sides or faces which cooperate with the fixed bearing, having a hollowed-out lower section and a relatively flat table top surface. The element 11 preferably is constructed from aluminum for reasons of weight.

A coil of wire 12 is secured to a cylindrical coil body 13 which is secured, by adhesive for example, to the lower portion of element 11 and is arranged to freely pass over the free end of core 3 within the air gap 6 when the element 11 is operatively positioned. As best seen in FIG. 2 the table element 11 includes a series of ducts or passages extending from a center chamber 15 to the bearing surface faces. While a specific number of ducts are shown associated with each bearing face, any desired number could be provided.

A gas duct 16 extends from the central chamber 15 to the outer periphery of element 11. The outer termination portion of duct 16 is preferably elongated in the direction of movement of the table assembly 2 so that compressed gas may be directed into chamber 15 from a fixed jet 17 throughout all vertical positions of assembly 2. Jet or orifice 17 may be rigidly secured to the fixed bearing support ring 8. Alternatively, the chamber 15 could be connected to the supply source for jet 17 by flexible hose means so that movement of the table assembly 2 would not be impeded thereby. Also, while the duct 16 of table assembly 2 is at a location not encompassed by the bearing, it is to be understood the duct could be relocated so that jet 17 could be directed through a special opening in any or all bearings to the central chamber 15. Such an arrangement would lend itself to a square shaped table assembly for example rather than the octagon shaped assembly disclosed.

A gas compressor C, driven by a motor M is connected to duct 14 and jet 17 by a tube 18. While not shown, means are provided for adjusting the pressure of the gas appearing at duct 14 and jet 17. It has been found that a pressure of 25 p.s.i. is satisfactory.

A generator (not shown) for generating currents within the audio frequency range is connected to flexible leads 20 attached to the coil 12.

The position of the fixed bearings with respect to the cooperating bearing surface of table element 11 is shown with a thin film of lubricating air there-between. In the unoperated position, elastic pads 10 continually urge bearing elements 9 into abutting relationship with the table 11. Also, the table assembly 2 is shown in its vertical operated position, it normally being at rest on the end of core 3.

To place the vibration machine in operation, compressed air from compressor C is passed through duct 14 and is directed into the hollowed out lower portion of table element 11, causing it to float in its illustrated position. As components to be tested are placed on the top of element 11, adjustments in the gas pressure are made to compensate for the weight of these components.

At the same time, compressed gas is directed from jet 17 into the central chamber 15 and exerts a force against the face of the fixed bearings 9, which force is adjustable, as noted, to cause compression of the elastic pads 10. The thickness of the lubricating gas gap between the cooperating bearings is thus adjustable by the gas pressure. It is apparent that any expansion or contraction of either or both bearing elements and supports are automatically compensated.

Also, according to the inventive arrangement, any lack of parallelism between the bearing elements of any bearing set is automatically corrected by compression of the elastic pads in one area more than another.

It can be seen that the gas lubricated gap can be kept as small or as large as desired, the practical limitations being sonic and/or lateral vibrations when the velocity of the gas becomes increasingly high or the gap becomes increasingly large.

When a component is to be tested and the necessary adjustments made to the gas pressure applied to the lower portion of the table element 2 to compensate for weight considerations, the coil 4 is energized and establishes a magnetic field through air gap 6 and traverses the winding 12 rigidly secured to table element 2. When an alternating current, for example between 10 and 10,000 cycles is applied to the coil winding 12, the current excursions are translated into vertical reciprocating excursions of the table assembly 2, the magnitude of the excursions of the table assembly 2 being primarily determined by the magnitude of the flux through the air gap 6, the amplitude of the alternating current applied to coil winding 12 and the mass of the table assembly and component being tested.

While I have described by invention in connection with specific apparatus, it is to be understood that my invention could be applied to numerous other applications without departing from the spirit of the invention. For example, the adjustable bearing surface could be secured to the table assembly by elastic means instead of being secured to the supporting ring 8 or both bearing surfaces of a gas bearing could be resiliently mounted.

Having described my invention, what I claim as new and desire to secure by Letters Patents is:

1. A vibration testing machine comprising a base, a reciprocating table for supporting objects to be subjected to vibration, and gas bearing means for supporting said table on said base for unrestrained vertical reciprocating movement and for limited movement in any other direction, the said gas bearing means comprising a first bearing element associated with and supported by said table and a second cooperating bearing element associated with and supported by said base, and elastic means for resiliently securing at least one of said bearing elements to its associated support and maintaining the last said bearing element in frictional contact with said other bearing element when the gas bearing is inoperative, said elastic means being stressed during operation of the gas bearing to move the last said bearing element out of frictional contact with said other bearing element.

2. A vibration testing machine as set forth in claim 1 wherein said elastic means is maintained under compression when the surfaces of said bearing elements are in frictional contact with each other.

3. A vibration testing machine as set forth in claim 1 wherein means is provided for establishing a gas lubricating film between the surfaces of said bearing elements by the application of gas under pressure to said surfaces and wherein the said movement of said bearing elements is controlled by the pressure of said gas.

4. A vibration testing machine as set forth in claim 1 wherein the said first bearing element comprises an integral part of said table.

5. A vibration testing machine as set forth in claim 1 wherein vibrations in the thickness of said gas lubricated film on expansion and contraction of said table is automatically compensated by corresponding variations in movement of said resiliently mounted second bearing element.

6. A vibration testing machine as set forth in claim 1 wherein a plurality of gas bearing means are provided each including the first and second said bearing elements with each said second bearing element being independently movable.

7. A vibration testing machine, comprising:
a table for carrying objects to be vibration tested;
vibration drive means for vibrating the table and objects in a substantially vertical direction;
a support base;
a first gas bearing including formed lower surface portions of the table and first cooperating surface portions of the base;
a second gas bearing including formed side surface portions of the table and second cooperating elements carried by the base; and
resilient means securing the second cooperating elements to the base and disposing the same in contacting relation with the formed side surface portions of the table when the second gas bearing is inoperative, the resilient means being compressed during operation of the second gas bearing maintaining the second cooperating elements and formed side portions of the table in a spaced relation.

References Cited
UNITED STATES PATENTS

| | | |
|---|---|---|
| 466,645 | 1/1892 | Wood. |
| 2,928,709 | 3/1960 | Baumeister. |
| 2,951,729 | 9/1960 | Skarstrom _____ 308—9 |
| 3,148,530 | 9/1964 | Woods _____ 73—71.6 X |
| 3,234,782 | 2/1966 | Grootenhuis _____ 73—71.6 |

FOREIGN PATENTS

| | | |
|---|---|---|
| 946,200 | 1/1964 | Great Britain. |

JAMES J. GILL, *Primary Examiner.*